July 13, 1937.　　F. G. KELLY, JR　　2,086,913

TRANSMITTING APPARATUS

Filed March 14, 1931

INVENTOR.
FREDERICK G. KELLY JR.
BY Duell, Dunn & Anderson
ATTORNEYS.

Patented July 13, 1937

2,086,913

UNITED STATES PATENT OFFICE 2,086,913

TRANSMITTING APPARATUS

Frederick G. Kelly, Jr., New Haven, Conn., assignor to The Engineering and Research Corporation, a corporation of Connecticut Application March 14, 1931, Serial No. 522,762

16 Claims. (Cl. 175—320)

This invention relates to a functionally and structurally improved apparatus for transmitting impulses and particularly electrical impulses of a certain and predetermined value.

It is an object of the invention to provide an apparatus of this character, the parts of which will be relatively few in number and individually simple and rugged in construction, these parts being readily assembled to furnish a comparatively inexpensive apparatus, operating over long periods of time with freedom from electrical and mechanical difficulties.

A further object is that of constructing an apparatus wherein the transmitted impulse will not vary in value regardless of the conditions which initiate such impulse.

With these and other objects in mind, reference is had to the attached sheet of drawings, illustrating practical embodiments of the invention, and in which.

Figure 1:
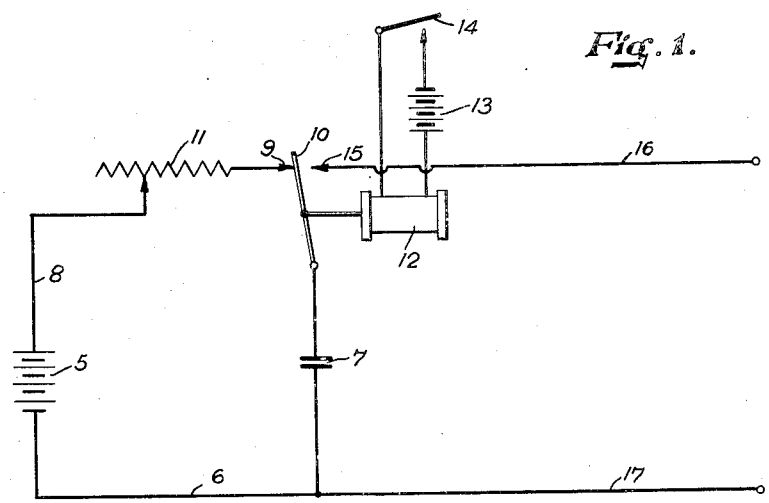
Fig. 1 is a view showing schematically a layout of apparatus, by means of which impulses are transmitted in accordance with the teachings of the present invention.

In these views, the numeral 5 indicates a source of electrical energy which is connected on one side, by means of a lead 6, to a condenser 7 of predetermined capacity. A lead 8 connects the other side of the source to a contact 9 with which a circuit breaker 10 cooperates. The resistance 11 is preferably interposed within the lead 8 in order to avoid the danger of sparking. While in certain aspects, it may be desirable to have this resistance adjustable, this element should be of such small value that substantially instantaneous charging of the condenser 7 follows when the circuit breaker 10 is in contact with terminal 9. In order to control the movements of the circuit breaker, a relay 12 is employed. This relay is in series with a source of electrical current supply 13 and a switch 14. With the relay deenergized, the condenser is charged until it has a voltage equal to that of the source 5.

Disposed within the path of travel of the circuit breaker 10, and engageable thereby is a second contact 15, connected to a lead 16. In the embodiment under consideration, a lead 17 is constantly connected to the other side of the condenser, and it is thus apparent that with the relay energized, the condenser will be connected to the leads 16—17.

In order to provide an impulse receiving apparatus, these latter leads are connected for example through a resistance 18 with a condenser 20 which has a capacity far greater than that of condenser 7. Consequently, it will require a certain number of impulses transmitted from the condenser 7 to build up the charge of condenser 20 to a predetermined value. This predetermined charge will be such that for example an ionizable gas filled tube 21 will be caused to flash and this tube is in series with the leads 16—17 and the relay 19. Consequently, current will not be fed to the relay 19 except when sufficient energy is stored within the condenser 20 to assure this result. At that time, however, this condenser will become completely discharged and accordingly, a series of impulses from the condenser 7 will again be necessary in order to assure a repetition of this result.

Figure 3:
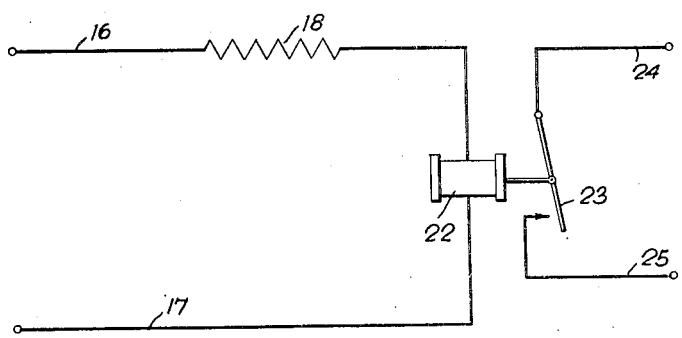
Fig. 3 shows another form of such latter apparatus.

A second form of impulse receiving apparatus is shown in Fig. 3 in which the leads 16 and 17 are connected to a relay 22 operating a circuit closer 23 in series with leads 24 and 25, and capable of closing the gap therebetween for any desired purpose. With a layout of apparatus such as this, it is obvious that each time the circuit breaker 10 engages the contact 15, the relay 22 will operate. As the energy is dissipated, relay 22 will not have sufficient power to retain the circuit breaker 23 in circuit closing position, and consequently, the circuit between leads 24 and 25 will open. As the amount of energy received by relay 22 is under each impulse constant, the operation of the relay 22 will accordingly not be variable, and the same timed sequence will follow in each instance. It is desirable in installations of this nature to employ resistance 18 so that sparking between the contact 15 and the circuit breaker will be avoided.

It is also desirable that relay 12 shall be of the type which effects an immediate shifting of its armature when energization occurs, but in which a slow release follows after deenergization. Thus, if switch 14 is closed for a long time, the transfer of energy by condenser 7 will have taken place, but if the switch 14 is closed for only a short period of time, relay 12 due to its slow dropout characteristics will maintain contact between the circuit breaker 10 and contact 15 until—as previously—the transfer of energy has taken place. Structures of this nature are well known in the art, a disclosure of one form being found, for example, in the United States patent to Nettleton et al., No. 1,742,367 of January 7, 1930.

Figure 2:
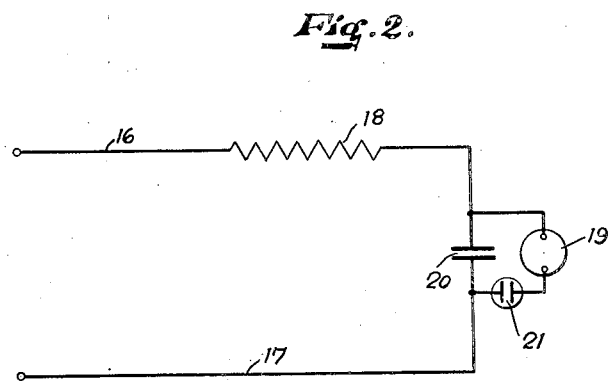
Fig. 2 is a view showing one form of impulse receiving apparatus which may be employed.

From the foregoing, it will be appreciated that an apparatus is provided in which regardless of the manner of operation of the switch 14, a constant impulse will be fed through leads 16—17. In the case of structure such as is exemplified in Fig. 3, each energization of relay 12 causes a predetermined sequence of operation. In the instance of structure such as that shown in Fig. 2, a predetermined number of operations of the switch 14 are necessary in order to effect a single operation of the unit 19.

Thus, among others, the several objects of the invention as afore brought out are achieved. It will moreover be appreciated that numerous changes in construction and rearrangements of the parts might be made without departing from the spirit of the invention as defined by the claims.

Having described my invention, what I claim as new and desire to secure by Letters Patent, is:

1. An apparatus of the character described, including means to receive and store a charge of electric current, charging means for said receiving means, a work circuit, means operable to connect said receiving means alternately to said charging means and to said work circuit and means to maintain said receiving means connected to said work circuit until a substantially complete transfer of charge has taken place.

2. An apparatus of the character described, including means to receive and store a charge of electric current, a source of current supply to charge said receiving means up to a predetermined potential, a work circuit, means operable to connect said receiving means alternately to said source of current and the work circuit, said last named means including means to retain connection with the work circuit until a substantially complete transfer of energy stored in said receiving means has taken place.

3. An apparatus of the character described, including means to receive and store a charge of electric current, a source of current supply adapted to charge said receiving means up to a predetermined potential, a work circuit, means operable to shift connection of said receiving means between the source of current supply and the work circuit and means to alternately energize and deenergize said shifting means, said shifting means including means to retain connection with the work circuit irrespective of deenergization of said energizing means until a substantially complete transfer of stored energy has taken place.

4. An apparatus of the character described including means to receive and store a charge of electric current, a relay, a source of electrical current supply, a switch for connecting and disconnecting said relay to and from said power supply, a current consuming element, means including a further switch operated by said relay when said relay is deenergized to connect said receiving means to said source to charge said receiving means and to connect said receiving means to said current consuming element when said relay is energized, said relay operative upon being energized to substantially instantly disconnect said receiving means from said source and having a retarding means causing it to act relatively slowly upon deenergization to disconnect said receiving means from said consuming element whereby the charge stored on said receiving means will be substantially all supplied to said current consuming element.

5. An apparatus of the character described including means to receive and store a charge of electric current, means for connecting said receiving means to a source of electrical power supply to charge the receiving means to a predetermined potential, a second charge receiving means having a capacity greater than that of the first receiving means, means for disconnecting said first receiving means from said source and connecting it to said second receiving means, an indicating device connected to said second receiving means, and a flash tube interposed in said last named connection and acting only upon said second receiving means reaching a predetermined potential to cause operation of said device.

6. An apparatus of the character described including in combination, a charge receiving device of predetermined capacity, a switch movable to connect said device to a source of electrical current supply, a further charge receiving device of greater capacity than the first named device, means including a gas discharge tube connected to said further device and operating to discharge said further device only upon the same having received a predetermined charge, and means for shifting said switch to disconnect said first device from said source and to connect said first device to said further device.

7. An apparatus of the character described including in combination, a charge receiving device of predetermined capacity, a further charge receiving device of greater capacity than the first named device, a switch movable to connect said first named device alternately to a source of electrical current supply and to said further device, a relay and a flash tube in series across said further device, said tube being operative only upon said further device receiving a predetermined charge to cause operation of said relay.

8. In combination, a charge transferring condenser, a charge collecting condenser, means for alternately charging said charge transferring condenser and discharging same into said charge collecting condenser for charging said charge collecting condenser by an amount dependent upon the charge of said charge transferring condenser to successively higher potentials, and means responsive to a predetermined high potential on said charge collecting condenser to discharge said latter condenser only from said predetermined potential.

9. In combination, a storage condenser, a charge transferring condenser, a charging circuit for the latter condenser, means for intermittently connecting said charge transferring condenser alternately to said circuit and to said storage condenser to progressively charge said storage condenser from said charge transferring condenser, a discharging circuit for said storage condenser, and a space discharge device included in said discharging circuit for closing the same only when the charge on said storage condenser reaches a definite value.

10. An impulse responsive device comprising a condenser, a second condenser of greater capacity than the first, impulse responsive means for repeatedly charging the first condenser, means for repeatedly charging the second condenser from the first, said operations occurring alternately to progressively charge the second condenser, and means including a gas discharge tube operating responsive only to a predetermined voltage across the second condenser corresponding to a predetermined number of impulses supplied to the device.

11. An apparatus of the character described including in combination, a condenser of predetermined capacity, a second condenser of greater capacity, a switch for connecting said first named condenser to a source of electrical current supply, means for shifting said switch to disconnect the first named condenser from said source and to connect said first condenser to said second condenser, and means including a gas discharge tube and a relay connected to said second condenser to discharge said second condenser only upon the latter reaching a predetermined charged condition.

12. An apparatus of the character described including an electric condenser, a second electric condenser of considerably greater capacity than the first, means including a switch normally connecting the first named condenser to a source of electrical current supply to charge said first condenser, electro-magnetic means operating when energized to shift said switch to disconnect said second condenser from said source and to connect it to said second condenser to transfer the charge from said first condenser to said second condenser said switch being restored to normal on deenergization of said electro-magnetic means, a second switch operable for connecting and disconnecting said electro-magnetic means to and from an electrical current supply to control energization of said electro-magnetic means, and a discharging circuit for said second condenser including an indicating device and a gas discharge tube in series across said second condenser, said tube adapted to pass current to discharge said condenser through said indicating device to operate the latter only upon said second condenser accumulating a predetermined charge corresponding to a certain number of operations of said second switch.

13. An apparatus as in claim 12 including retarding means for said electro-magnetic means operating to retard restoration of the first switch to normal on deenergization of said electro-magnetic means so as to assure substantially complete transfer of charge from said first condenser to said second condenser upon each alternate energization and deenergization of said electro-magnetic means.

14. An impulse counter comprising a source of current, a charge transferring condenser for receiving charges therefrom, means controlling the charging of said condenser, means controlling the discharging thereof, a charge collecting condenser for receiving charges from and in accordance with the charge of said charge transferring condenser, and means including a gas discharge tube connected to be responsive to a predetermined potential across said charge collecting condenser, said controlling means being arranged alternately to charge said charge transferring condenser and to discharge it into said charge collecting condenser in response to successive impulses thereby progressively charging said charge collecting condenser to a higher potential with each impulse up to said predetermined potential.

15. An impulse counter comprising in combination, a charge transferring condenser, a charge collecting condenser connectible therewith, means for alternately charging said charge transferring condenser and discharging it into said charge collecting condenser to charge the latter condenser by connection to said charge transferring condenser by an amount dependent upon the charge of said transferring condenser to successively higher potentials in response to each impulse to be counted, and the means including an electronic tube responsive only to a predetermined high potential across said charge collecting condenser and discharging the last named condenser only from said predetermined high potential.

16. An apparatus for counting electric impulses comprising a condenser, means responsive to each impulse for charging said condenser, a second condenser of considerably greater capacity than the first condenser, means also responsive to each impulse for discharging said first condenser into said second condenser to charge the second condenser from the first, means including a gas discharge tube for discharging said second condenser in response only to a predetermined charge accumulation thereon corresponding to a certain number of impulses, and electro-magnetic means operated by such discharge from said second condenser for indicating the counting of such certain number of impulses.

FREDERICK G. KELLY, Jr.